United States Patent [19]
Chauvin et al.

[11] 4,071,304
[45] Jan. 31, 1978

[54] SEPARATION OF PRODUCTS IN GRANULAR FORM

[75] Inventors: Raymond Chauvin, Verneuil-en-Halatte; Pierre M. M. Guillon, Paris, both of France

[73] Assignee: Charbonnages de France, Paris, France

[21] Appl. No.: 690,064

[22] Filed: May 26, 1976

Related U.S. Application Data

[63] Continuation-in-part of Ser. No. 490,033, July 19, 1974, abandoned.

[30] Foreign Application Priority Data

| | | |
|---|---|---|
| July 27, 1973 | France | 73 27584 |
| June 24, 1974 | France | 74 21826 |
| Aug. 18, 1975 | United Kingdom | 34285/75 |

[51] Int. Cl.² ............................................. B05D 1/24
[52] U.S. Cl. ................................. 427/185; 427/213; 427/215; 426/443; 264/14; 264/117; 23/313 FB; 71/64 DB; 209/44; 209/250; 209/492
[58] Field of Search ................. 209/44, 490, 466–469, 209/492, 493, 138–141, 250, 5, 11, 252, 238; 34/57 R, 57 A, 10, 12; 426/443; 75/26; 165/104 F; 432/15, 16; 427/185, 213, 215; 201/31; 71/64 D, 64 DB; 23/313 FB; 51/163.2; 264/14, 117

[56] References Cited

U.S. PATENT DOCUMENTS

| | | | |
|---|---|---|---|
| 3,097,958 | 7/1963 | Morris | 427/185 X |
| 3,161,483 | 12/1964 | Morris | 209/466 X |
| 3,444,996 | 5/1969 | Douglas et al. | 209/44 |
| 3,533,829 | 10/1970 | Quanquin | 427/213 |
| 3,834,927 | 10/1974 | Putney | 427/185 X |
| 3,844,071 | 10/1974 | Barlett et al. | 51/163.2 |

FOREIGN PATENT DOCUMENTS

| | | | |
|---|---|---|---|
| 1,142,046 | 2/1969 | United Kingdom | 23/313 FB |

*Primary Examiner*—Frank W. Lutter
*Assistant Examiner*—Ralph J. Hill
*Attorney, Agent, or Firm*—Karl W. Flocks

[57] ABSTRACT

In apparatus for treating and separating products in granular form, a container is provided with fluidization and vibration means, the grains and the pulverulent solid are subjected to the fluidization treatment only in a vertical portion of the bed, the circulation currents arising therefrom are utilized for separating, within the container itself, the treated product in granular form from the pulverulent solid, and the vibrations are utilized for discharging the treated products to the outside.

23 Claims, 12 Drawing Figures

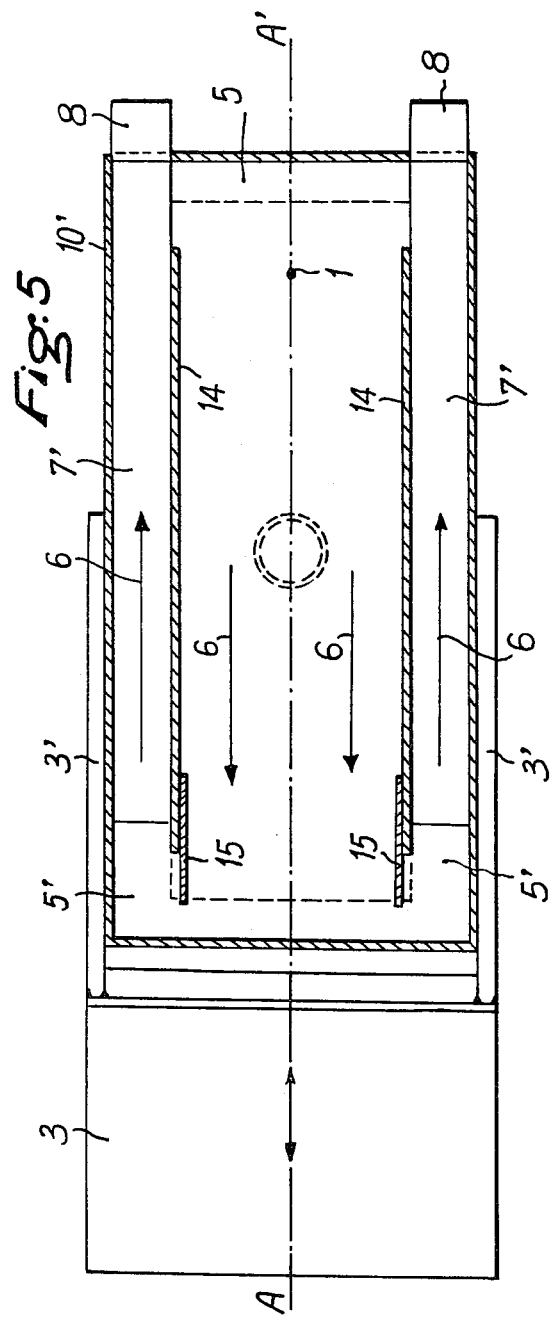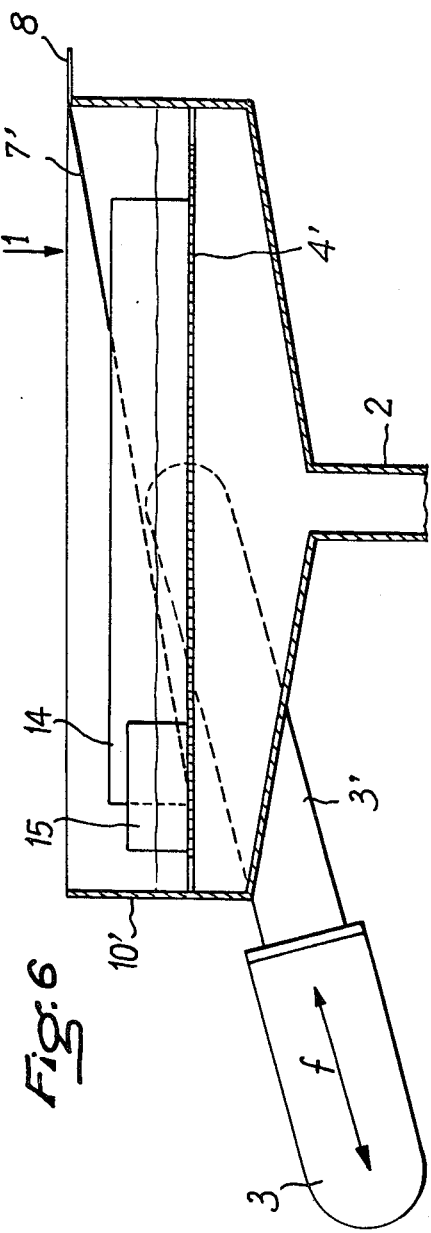

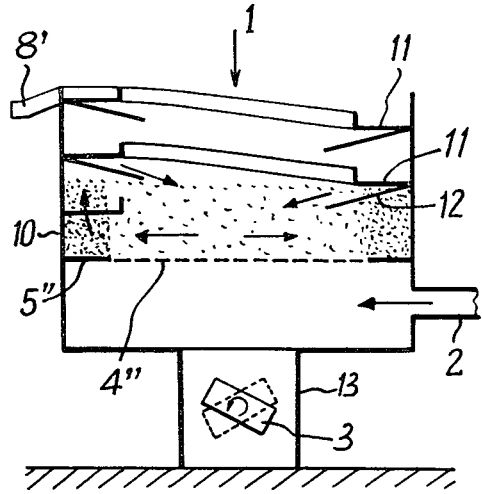
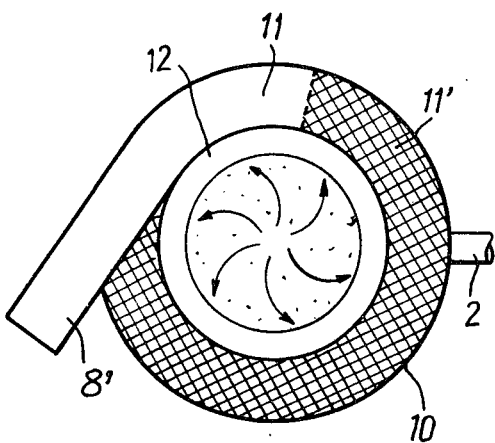
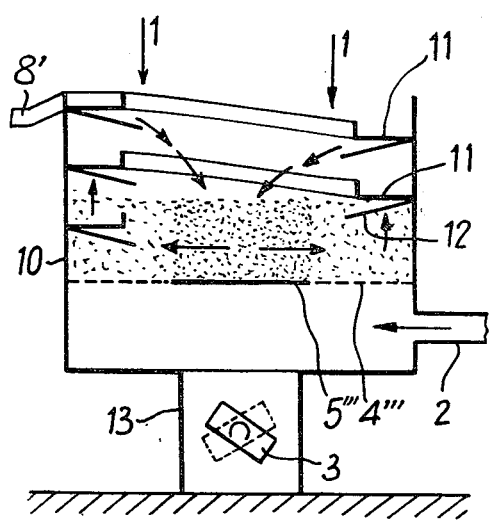
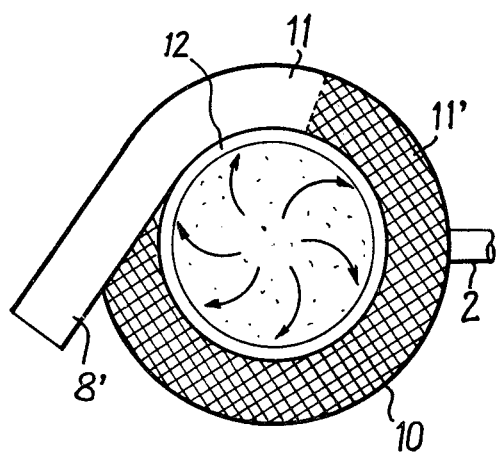

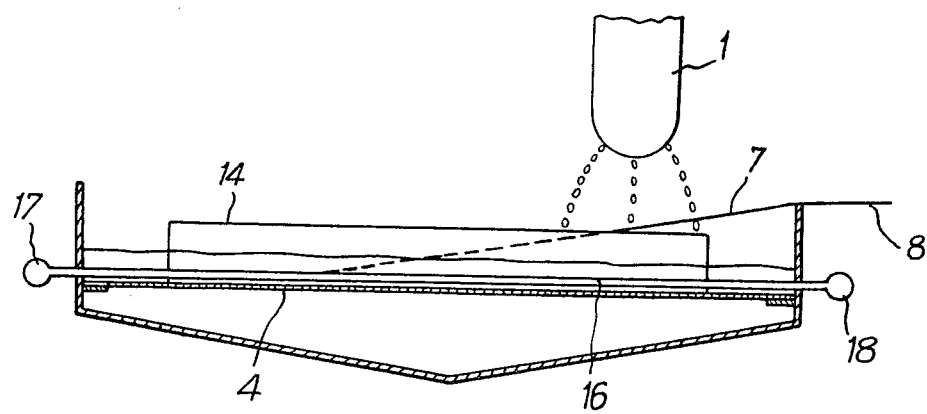
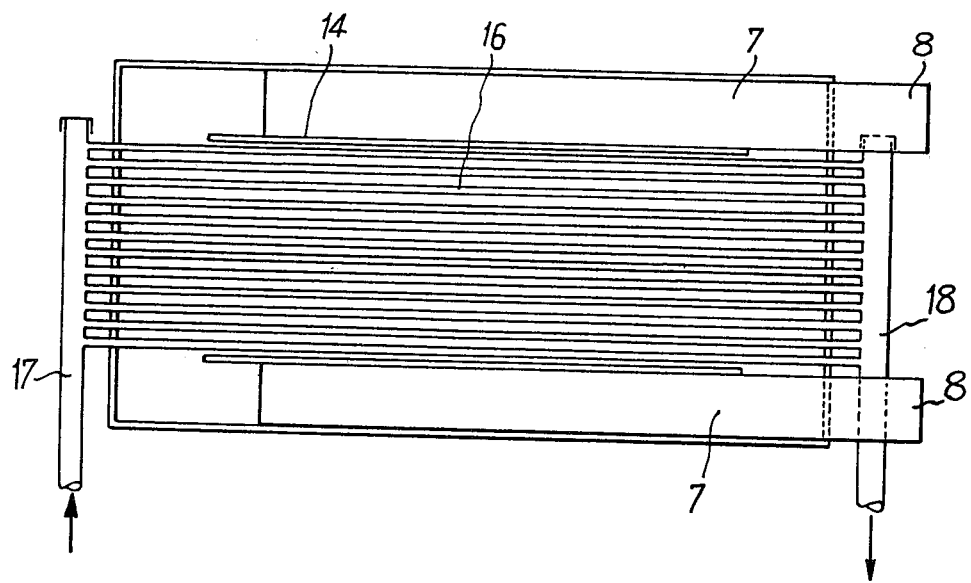

SEPARATION OF PRODUCTS IN GRANULAR FORM

BACKGROUND OF THE INVENTION

This application is a continuation-in-part of application Ser. No. 490,033 filed July 19, 1974, and now abandoned, by the same inventors.

The invention relates to a process for the treatment or production, followed by separation, of products in granular form which are treated in a container containing a bed of pulverulent solid material composed either of the product treated or of an auxiliary solid material, the bed being subjected to simultaneous fluidization and vibration treatment. It also relates to an apparatus for the treatment and separation of products in granular form which are treated in a container containing a bed of pulverulent solid material which is subjected to simultaneous fluidization and vibration treatment, comprising a fluidization container with means of introducing a fluidization agent, means of vibrating the container and the fluidized bed maintained in the active zone of the container.

It is known to utilize fluidized beds for various treatments, such as drying, baking, or the ozidation of granular or granulated products, or else for coating grains whose surface is viscous and is covered with a thin layer of the solid pulverulent material of the fluidized bed. It has also been proposed to granulate materials in powder form by suspending them in a liquid, which is introduced into a hot fluidized bed in the form of drops, the evaporation of the liquid being accompanied by the formation of granules. It is likewise known to subject fluidized beds to vibration treatment.

On the other hand, it is already known to granulate substances such as pitch, for example, by introducing them in drops into a current of water. The granulates of the product obtained by this process nevertheless entrain a little water, which is inconvenient for certain applications, so that a drying treatment is required.

British Pat. No. 1,007,109 discloses a process for agglomerating powdered sugar in an apparatus which is subjected to vibrations and which comprises three distinct zones. In the first one, the powdered sugar is fluidized and agglomerated under the action of water steam, in the second one the product is dried and in the third one it is screened. It should be noted that in this process, the agglomerated particles fall to the bottom of the bed and are no longer fluidized. This makes their traveling possible, since, as is known, the vibrations are not transmitted through a fluidized bed. The fine particles can progress only by overflow or entrainment by the agglomerated particles and the motion is then possible only because the agglomerated product is not fluidized.

U.S. Pat. No. 3,533,829 discloses a process for granulating paste in which the paste to be granulated is sprayed in a fluidized bed of fine particles. The particles are coated with paste and their size increases progressively. The fluidized bed is subjected to vibrations, but, as in the British Pat. No. 1,007,109, the vibrations affect only the large particles which are not fluidized or the ones which are located in the extreme part of the apparatus which is not subjected to fluidization. The vibrations have then no effect on the traveling of the fluidized particles. On the other hand, there is no separating means provided in this patent.

U.S. Pat. No. 3,444,996 discloses a sink and float apparatus where the heavier pieces sink to the deck and lighter pieces float over the side to a screen. The currents within the fluidized zone containing all of the products are vertical so as to sink and float the products. The invention, on the other hand, is for processing of products in a bed of pulverulent solid material and the vertical column of this material in the fluidized zone is fed toward the vertical column of non-fluidized material also in a vertical column. Finally the apparatus of U.S. Pat. No. 3,444,996 is able to obtain a densimetric separation, but not a granulometric one of pieces having close densities, as in the present invention.

In U.S. Pat. No. 3,097,958, a material to be coated is introduced by a chute and falls into a fluidized bed near a porous deck and is conveyed toward the center. It is only by the fact that the material to be treated is more dense than the pulverulent material that the material is allowed to be conveyed on the deck subjected to vibrations. The movement of the material is due to the density of the material being higher than the density of the pulverulent particles allowing the material to travel on the porous deck.

U.S. Pat. No. 3,834,927 discloses a fluidized bed coating method using vibrations for homogenous agitation of the pulverulent plastic material which is to be applied to a suspended article. The bed is uniformly fluidized. This is a uniform fluidization throughout the container and no separation means of the articles from the fluidized bed is shown.

In all these processes, it is necessary for the products in granular form to be separated from the pulverulent solid after treatment. In the processes of the prior art, this is generally achieved either by virtue of the difference between the density of the granules and the density of the pulverulent solid or by withdrawing part of the contents of the fluidized bed, screening it, and recycling the pulverulent solid. It is often necessary to re-heat the pulverulent solid before recycling it, since the separation is necessarily accompanied by a loss of calories. This loss of calories may be considerable since it is necessary to have a quantity of pulverulent material from about 10 to 20 times larger than that of material to be granulated, in order to avoid that the granules stick together and gather into clusters. The aim of the invention is to avoid such operations, which are expensive in terms of energy and heat and are detrimental to the quality of the products and to propose a new process and a new apparatus in which the products in granular form are separated within the fluidized bed itself, and by virtue of their particle size and not of their density.

SUMMARY OF THE INVENTION

According to the invention, this aim is achieved through the fact that in a container provided with fluidization and vibration means, the grains and the pulverulent solid are subjected to the fluidization treatment only in a portion of the cross-section of the bed but along the whole vertical height of the bed, the circulation currents arising therefrom are utilized for separating, within the container itself, the treated products in granular form from the pulverulent solid, and the vibrations are utilized for discharging the treated products to the outside.

In an apparatus of the invention, of the type previously described, this aim is likewise achieved through the fact that it comprises a fluidization agent distributor feeding only a portion of the bed, screening means, and means of discharging through vibration the material retained by the screens.

The applicants have observed that in these conditions circulation currents of stable pattern are established in the fluidized bed, and that these can then be used for transporting the grains or granules in the interior of the bed, from their inlet point to their outlet point.

It is an important advantage of the invention to process large quantities of granules by recycling very small amounts of pulverulent product forming the fluidized bed while the speed of traveling of the pulverulent product is sufficiently high to move the granules away from their place of arrival in the bed. Thus the formation of clusters is avoided, because the granules have not enough time to gather at their dropping place and they are rapidly entrained towards the separating means. As is known, vibrations are not transmitted through a fluidized bed; thus the granules are subjected to normal conditions of fluidization. The vibrations however are transmitted to the non-fluidized portion of the bed of pulverulent product and tend to move it in the direction of application of the vibrations. A characteristic of the invention is to make the direction of the vibration substantially coincident with the direction of the "channels," with or without partitions, corresponding to the non-fluidized portions of the bed of pulverulent product. Under the effect of the vibrations in the straight or circular "channels," it is observed that the pulverulent product, with the granules it contains, moves toward one of the ends of the channel in the case of a straight channel or moves substantially in a circular way in the case of a circular channel. In this manner a current is established in the channel so that pulverulent product is entrained from the fluidized bed to the non-fluidized portion of the bed. Since fluidized beds have the property to flow like a liquid, rapid natural flow is formed in the fluidized bed which carries away the granules toward the non-fluidized zone, in which through the vibrations they are directed toward the means for screening and discharging by vibrations. It is easy to control the rate of circulation of the products by adjusting the width of the non-fluidized zones forming the "channels," or the frequency and amplitude of the vibrations, or by inserting flow regulating flaps in the non-fluidized zone above the masking element.

However a limit is set to the air flow since it cannot exceed a certain value, for example 0.1 to 1 meter per second for pulverulent products. It may happen that the permitted flow of hot or cold fluidization air is not sufficient to supply the required calories or frigories. In order to increase the output, it is necessary to supply calories or frigories above the fluidization grid, either by means of an exchanger, or by partly recycling (for example 10% of the internal rate of flow) part of the pulverulent product which it is then necessary to discharge, heat or cool before reintroducing it.

In case of solidification of a molten material the temperature of the pulverulent product in the fluidized zone is kept sufficiently low to effect sufficiently rapid solidification of the drops to prevent the pulverulent product from sticking to the surface of the drops.

The heat released on the solidification of the molten material and their subsequent cooling has to be dissipated. This can be achieved by regulating the temperature of the gas used to effect the fluidization of the pulverulent product, but sufficient cooling of this gas to dissipate all the calories given up by the molten product, although technically possible, cannot be achieved economically.

The dissipation of the heat given up by the molten product can be considerably accelerated by providing heat exchange means in the bed. The heat exchange means may be a cooler in which a cooling fluid circulates. For example, a water circulation type cooler may be located in the fluidized layer above the grid through which the fluidizing agent flows.

It is also possible to utilize the heat absorption capacity of certain changes of state, for example vaporization. The vaporization liquid may be injected into the fluidizing agent. In the case of the vaporization of water, the water is atomized into the fluidization air and the evaporation of the microdrops in the fluidized layer will cool the latter.

Further, a vaporizable liquid may be injected into the fluidized bed. For example, water may be injected directly into the fluidized bed itself.

It has been found, surprisingly that, when the cooling achieved in this manner was sufficiently vigorous, spherical granules were obtained which contained practically no particulate auxiliary treatment material sticking to their surfaces. Conversely, the speed of cooling can be regulated so that a certain amount of the pulverulent product adheres to the surface of the granules if this product has particular properties, such as an anticaking action, or a filler action. It should be noted that the auxiliary treatment product may be constituted by the actual material which is to be granulated, which is ground to the desired fineness to permit fluidization. In this case, the entrainment of the particulate auxiliary treatment phase adhering to the surface of the granules is not troublesome.

The product to be granulated may be introduced into the bed in the molten state. The process of the invention can thus be applied to the granulation of various molten products, for example pitch, bitumen, thermoplastic resins or glass. The process can also be used to granulate concentrated solutions introduced into the bed, by solidifying by crystallization, for example, solutions of urea or ammonium nitrate.

The invention also comprehends apparatus for carrying out the process of the invention, and products in granular form produced by the process.

In a preferred embodiment, the means of fluidizing only a portion of the bed are composed of a fluidization agent distributor of narrower section than that of the container.

To this end it is advantageous for the fluidization agent distributor to feed only the central portion of the container or an annular or lateral portion of the container.

It is also advantageous for at least part of the screening means to be disposed in a portion of the bed which is not subjected to the fluidization treatment.

In a modified embodiment, the means of vibrating the reactor are applied to the wall of the latter and direct the vibrations rectilinearly substantially in an axial plane of the bed at an angle of from 0° to 80° in relation to the horizontal, the means of vibrating the bed are composed of rigid elements connected to the wall of the reactor, and the screening means are disposed at the top portion of the bed, in a non-fluidized part, and the same means are so arranged as to discharge out of the container, through vibrations, the material retained by the screens. It is advantageous for the vibration to be applied in a direction passing through the center of gravity of the entire apparatus.

It is likewise advantageous for the means separating the product in granular form from the pulverulent solid to be composed of screens fastened to the container subjected to vibrations, the said screens being inclined in relation to the horizontal and their lower portion penetrating into the container, while their upper portion constitutes an overflow to the outside of the container. Through the action of the suitably directed vibrations, the grains or granules move over the screens in the direction of the top overflows, while the pulverulent solid passes through the screens and remains in the bed.

It is likewise advantageous for the direction of the vibrations and the middle plane of the screen to form an acute angle, in such a manner that the vibrations of the screen assist the flow of the products in granular form to the outside, and for the screening and the vibrating means to be disposed oppositely to one another on the reactor. The inclination of the screens is determined in each particular case in accordance with the rules of the art. In this modified embodiment, the entire bed is subjected to a linear vibration of moderate amplitude (preferably 0.2 to 3mm) and of sufficiently high frequency, which for reasons of convenience may be made equal to 50 Hz.

According to another modified embodiment, the means of discharging through vibration the material retained by the screens are composed of a projecting helicoidal ramp disposed on the inner face of the container and provided with screening holes at least over a certain length, and the means of vibrating the reactor and the fluidized bed produce circumferential jolts on the container and transport in the upward direction the products retained on the helicoidal ramp.

This last-mentioned embodiment therefore utilizes a known process in which a cylindrical container provided with a helicoidal ramp is subjected to circumferential jolts on the container, these jolts transporting the upward direction the products which have reached the helicoidal ramp. In a container of this kind, small objects, that is to say in the present case the grains or granules, perform on the ramp an upward centrifugal movement. Numerous bowls for screening, sorting, and distributing small pieces utilize a process of this kind. Applications thereof are also known in the drying of granular materials. The application of jolts to the advancing and sorting of materials on a screen are also known. These jolts or vibrations are produced by rotating-mass unbalance machines or vibration magnetic generators, both of which are known per se.

It is then advantageous for the helicoidal ramps to be provided with an edging and for a helicoidal deflector to be disposed under each helicoidal ramp.

In all the embodiments of the invention, provided that in accordance with the invention a portion of the bed is not subjected to the action of the fluidization agent, the circulation of the product in the bed and on the screens is surprisingly achieved through the combined effect of the fluidization and the vibration. If the vibration is eliminated or if the entire bed is subjected to the action of the fluidization agent, no circulation of the product will be observed. If the fluidization is eliminated, the product will accumulate spontaneously in any privileged zone and the phenomena of screening and transport of the grains on the screens are no longer observed.

The scope of the invention will not be exceeded if in the container of any of the embodiments there is added a vertical internal partition separating the fluidized zone from the non-fluidized zone, provided that this wall terminates at top and bottom respectively at a certain distance from the bottom of the container and at a certain distance from the operative zone of the latter, so that it does not modify the displacement flow of the materials, as indicated by the arrows in the drawings.

BRIEF DESCRIPTION OF THE DRAWINGS

FIGS. 5 and 6 are diagrammatical views in plan and vertical section respectively of a variant of an apparatus according to the invention of a parallelepipedic type;

FIGS. 7 and 8 are diagrammatical views in cross-section and plan respectively of an apparatus according to the invention, of the cylindrical type with a helicoidal ramp;

FIGS. 9 and 10 are diagrammatical views in cross-section and plan respectively of a variant of an apparatus according to the invention, with a helicoidal ramp; and FIGS. 11 and 12 are diagrammatical views in cross-section and plan respectively of another variant of an apparatus according to the invention, of the parallelepipedic type.

DESCRIPTION OF THE PREFERRED EMBODIMENTS

In the description and in the claims, wherever used, the term "vertical columnar fluidized bed zone" means that the fluidized zone extends throughout the whole height of the bed, i.e. vertically from the grid to the top of the bed.

Figure 1:
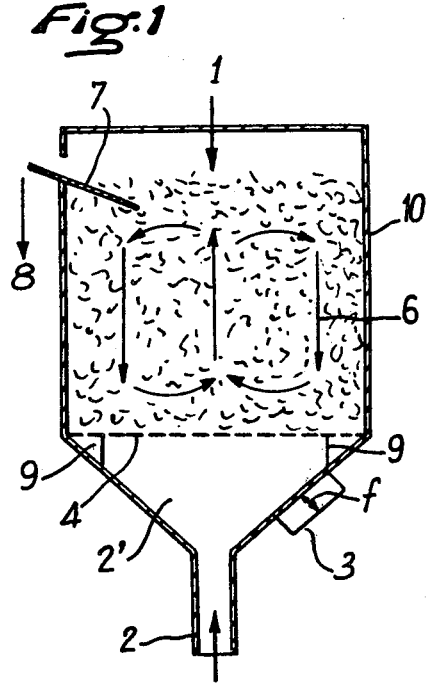
FIGS. 1 and 2 are respectively diagrammatical views in vertical section and plan of an apparatus according to the invention of cylindrical type with a straight screen.
Figure 2:
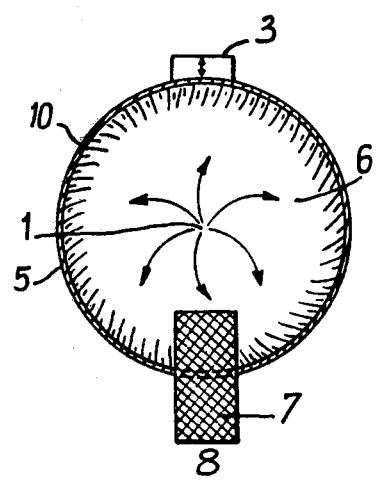

In FIGS. 1 and 2, there is shown a circular fluidization reactor 10 comprising a fluidization gas inlet 2 and rigid elements connected to the walls of the reactor 10, for example a grid 4, and at the bottom part, a vibration generator 3 producing vibrations in the direction of the arrow $f$. The reactor shown in FIG. 1 is shown with a top but can just as well be open at the top as in other embodiments shown, but it would be possible to utilize any other known reactor in order to take into account conditions due to the temperature of the fluid, the gases liberated, and the dusts entrained. At the top of this reactor is added a slightly inclined screen 7 discharging at an overflow point 8. The vibrations indicated by the arrow $f$ are substantially directed towards the screen 7. Only a central portion of the section of the grid 4 is supplied with fluidization agent, for example, owing to the masking of a peripheral annular zone by means of an annular deflector 9. The reactor is then used for treating products in grain form in a bed of auxiliary pulverulent solid. In certain cases the granulation may be effected in the bed from the pulverulent solid.

The product to be treated is then introduced at 1 at the top and the gas or fluidization agent at 2. The vibrations are applied in the direction indicated by the arrow $f$, and the fluidized bed is established above the central section of the grid 4 which is made of a sufficiently rigid material to transmit the vibrations to the entire bed. The peripheral zone of the bed is not fluidized, because the grid is masked by the annular deflector 9 or because, in a variant, the grid 4 has an unperforated annular zone, so as to effect good distribution of the fluidization fluid in the central section of the reactor. Whatever means is adopted it is essential that the fluidization agent distributor 2' fed by the pipe 2 should discharge into the reactor with a narrower section than that of the latter. Through the action of the vibrations, circulation currents represented by the arrows such as 6 are then established in the fluidized bed. The screen 7 fastened to the remainder of the apparatus effects the separation of the pulverulent auxiliary solid passing through it substantially from top to bottom and the products in grain form which, through the action of the vibrations, are moved on the surface of the screen 7 and overflow at 8, where they are collected.

Figure 3:
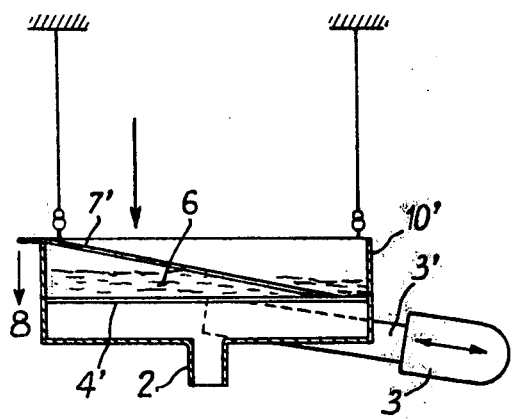
FIGS. 3 and 4 are respectively diagrammatical views in vertical section and plan of an apparatus according to the invention, of parallelepipedic type.
Figure 4:
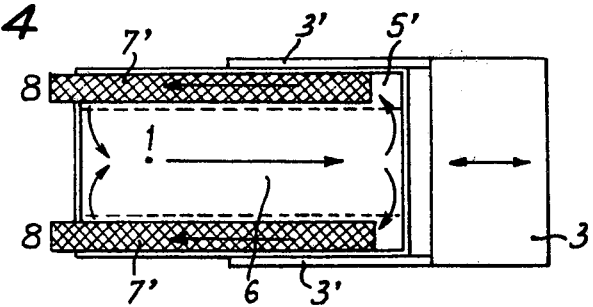

In FIGS. 3 and 4, which illustrate an embodiment of the invention utilizing a parallelepipedic fluidized bed, the same references have been used as in FIGS. 1 and 2 with prime numbers denoting variations in those parts. In this case, there are therefore two screens 7' leading to two overflow points 8, the screens being in this case disposed laterally. In the lateral portions of the reactor the fluidized bed must then of course have a non-fluidized zone 5', obtained by providing on the grid 4' an unperforated lateral zone or longitudinal deflectors limiting the action of the fluidization agent to the central zone between the two lateral zones 5'. Vibrations are transmitted from the vibration generator 3 to reactor 10' through arms 3'.

In FIGS. 5 and 6, there is shown another apparatus utilizing a parallelepipedic fluidized bed, in which the fluidized and non-fluidized zone are separated by a vertical internal partition 14. Flaps 15 are also provided to regulate the flow of the products in the non-fluidized zone.

In FIGS. 7 to 10 is shown a circular fluidization container 10 comprising a fluidization gas inlet 2 leading into a blast box 2', and rigid elements connected to the walls of the reactor 10 and constituting the bottom of the cylindrical portion of the apparatus. The products which are introduced are admitted at 1.

In FIGS. 7 and 8, the bottom of the cylindrical portion is formed by a central grid 4" disposed at the center of a fluid-tight ring 5". The fluid coming from the blast box or fluidization agent distributor 2' subjects the grains and the pulverulent solid to fluidization, but does so only in the central portion and not on the periphery of the apparatus. A helicoidal ramp 11 having an edging is disposed on the internal walls of the container 10 and discharges to the outside through its top portion onto a spout 8'. This ramp 11 is provided with perforations forming screen portions 11' at least in its portion penetrating into the fluidized bed and on a portion not penetrating into the latter, and therefore serves as a screen intended to retain the grains and allows the pulverulent solid to pass through. The holes in the screen 11' are round or elongated. Under the ramp 11 is disposed a helicoidal deflector 12 the purpose of which is to return the pulverulent solid to the treatment zone.

Symmetrically to its base 13 the apparatus is provided with two unbalanced motors comprising the vibration device 3 producing circumferential jolts suitable for causing the grains to rise on the ramp 11, as already stated.

If the vibration device 3 is now put into operation and the flow of gas is adjusted at blast box 2' to effect fluidization of the central zone, it will be found that the product to be treated, which is fed at 1 to the center of the apparatus, falls into the fluidized portion where it undergoes the desired treatment and reaches the periphery, where it is discharged together with part of the pulverulent product by means of the helicoidal ramps 11. The screens 11' separate the granules from the fine particles, the former passing up through the top of the container, while the latter fall back to the center of the container, into the fluidized zone. In this apparatus the fine particles, the maximum dimension of which depends on the characteristics of the screens used, does not leave the apparatus and is continuously recycled, while the granules are extracted easily.

The apparatus shown in FIGS. 9 and 10 differs from that just described only through the fact that the annular portion of the bottom is in the form of a grid 4''', while the central portion 5''' is impermeable to the fluidization gas.

This arrangement, which is exactly the opposite of the previous arrangement, of the two concentric zones of the bed, namely a non-fluidized zone in the center and a fluidized annular zone on the periphery, likewise makes it possible to effect the treatment of granules in a fluidized bed and their separation from the pulverulent phase. This arrangement is suitable for fragile products for which short residence times in the fluidized phase are required and it is desired to avoid their passing through the dense vibrated phase.

In applications utilizing the process of the invention, it may furthermore be necessary to provide heat to the fluidized bed. This may be effected either by heating the current of gas or by withdrawing by any suitable means a fraction of the pulverulent solid substance, heating it, and recycling it.

In FIGS. 11 and 12, there is shown an apparatus utilizing a parallelepipedic bed in which is provided a water circulation type cooler located in the fluidized layer above the grid through which the fluidizing agent flows. This cooler consists of a nest of tubes 16 placed above the grid 4'''. At their ends the tubes 16 are connected in common to a water inlet pipe 17 and to a water outlet pipe 18.

Because of the ease of separation achieved, the process according to the invention can be applied in all cases where it is desired to effect in a fluidized bed a separation based on the granulometry of the particles.

Without this constituting a limitation, mention may be made of all processes for drying, chemical treatment, heat treatment, or coating of products in grain form in a fluidized bed.

EXAMPLE 1

The process and the apparatus of the invention may also be used in the separation of granulated products. As an example, a compound fertilizer containing 10% of nitrogen, 15% of phosphoric acid, and 20% of potash was ground in particles smaller than 300$\mu$ and then suspended in 25% of its weight of water. This suspension, divided into drops of about 5 mm in diameter, was dropped into a fluidized bed of the same fertilizer powder, which has been brought to a temperature of 180° C. Hard dry grains of a diameter of from 5 to 10 mm were obtained. The apparatus used was that illustrated in FIGS. 1 and 2, with a gas recuperation collector.

EXAMPLE 2

The apparatus shown in the FIG. 11 and 12 has been used for granulating an electrode pitch having a Kramer and Sarnow melting point KS 70°–80° C.

The molten pitch is kept at 170° C in a vessel the bottom of which is pierced with round holes of 2 mm diameter. When it flows through these apertures the pitch is divided into drops, which fall into a fluidized bed of a silica sand whose granulometry is under 0.2 mm. The layer of sand is fluidized by blowing air at 20° C upwardly through the grid 2 and through the water circulation heat exchanger disposed inside the layer.

Under these operating conditions quasi-spherical balls or granules of pitch of a diameter 3 mm to 5 mm are obtained which have very little of the material of the bed adhering to their surface (less than 0.2%). If this small amount of silica could not be tolerated for the purposes for which the pitch is to be used, the silica of the fluidized bed could easily be replaced by a less troublesome material, such as alumina or coke dust.

The vessel containing the molten pitch may be subjected to vibrations. This means makes it possible to increase the flow of drops through each aperture or to lower the temperature of the molten pitch, for example to use pitch at 155° C instead of 170° C.

EXAMPLE 3

The process is carried out as in Example 1 but using, instead of pitch, a bitumen distillation fraction of KS 100 (Escorez resins — Registered Trade Mark).

Granules similar to those of Example 1 containing practically no material of the fluidized bed are obtained.

EXAMPLE 4

Novolaks (phenol-formol resins) melted at 100° C to achieve correct fluidity are granulated as in Example 1 in a fluidized bed of a silica sand whose particles pass through a 0.2 mm screen, the bed being kept at a temperature of 20° C. Very hard granules, with low fragility, of a diameter of from 2 mm to 5 mm and entraining only very little sand, are obtained.

EXAMPLE 5

It was also possible to granulate plaster by dropping drops of water, optionally containing a surfactant and/or aluminium sulphate, into a fluidized plaster bed at ambient temperature. The apparatus used was that illustrated in FIGS. 3 and 4. Granules of a diameter of about 10 mm were obtained.

EXAMPLE 6

A slip containing 30% of water and prepared from schist in powder form was also granulated by dropping it in the form of drops into a fluidized bed of sand at 250° C. The apparatus used was that shown in FIGS. 1 and 2, with a gas recuperation collector. Pellets of expanded schist of a diameter of from 1 to 5 mm were obtained.

EXAMPLE 7

This involves drying and coating ammonium nitrate granules with an anti-caking agent.

By prilling ammonium nitrate, granules are obtained which have a residual moisture content of 2 – 4% when being discharged from the granulation tower. It is necessary to dry them to less than 0.2% moisture, and to coat them with an anti-caking agent such as calcium carbonate, Kieselguhr etc. The process and the apparatus of the invention are applied to carry out this twofold treatment of the granules of ammonium nitrate produced in prilling towers. The 3–5 mm granules of ammonium nitrate with a water content of 2-4% are fed into the fluidized bed reactor whose phase of treatment is finely ground calcium carbonate. The fluidization agent is air whose temperature is sufficiently high to maintain a temperature of 110° C in the fluidized bed. Under these conditions, it is possible to dry the granules of ammonium nitrate to less than 0.2% moisture and to coat them with calcium carbonate; thus the granules are coated with 3% by weight of calcium carbonate.

In the same manner, it is possible to coat pitch granules with finely ground coke to avoid sticking on storage, to coat small ceramic articles with powdered enamel, to coat aluminum balls with a catalyst.

OTHER APPLICATIONS

The process of the invention can also be used for granulating foodstuffs in powder form, such as cocoa, coffee, powdered milk, powdered cereals, starch and hydrolysis products thereof. Either drops of water, optionally containing sugar, flavoring, coloring and expansion agent may be dropped into a fluidized bed of the powder which is to be granulated, this bed being kept at a suitable temperature, or the substance to be granulated may be suspended or dissolved in water and dropped in the form of drops into the heated fluidized bed.

In the accompanying drawings the non-fluidized portion corresponds to the annular, lateral, or central zones of the container. Although these are the most advantageous embodiments of the process of the invention, it is obviously possible to conceive apparatuses in which the non-fluidized portion would not necessarily correspond to a peripheral, lateral or central zone.

It will be obvious to those skilled in the art that various changes may be made without departing from the scope of the invention and the invention is not to be considered limited to what is shown in the drawings and described in the specification.

What is claimed is:

1. A method for processing granules in a bed of particles of a product partially fluidized by a fluidization agent in a predetermined range of temperature, utilizing at least a raw material formed and processed in a divided state, the said divided state being of the group consisting of drops and granules, the said method comprising the steps of forming a vertical columnar fluidized bed zone in a container having sidewalls and at least one endwall, forming a vertical columnar non-fluidized zone in said container extending substantially the length of said sidewalls and parallel thereto, the vertical columnar non-fluidized zone constituting at least one horizontal channel having a horizontal direction, the channel not being subjected to the fluidizing agent;

vibrating the container with vibrations directed to apply to each point of each channel with vibrations oriented at an angle of 0° to 80° to the horizontal, in a vertical plane substantially in the direction of the channel, said vibrations serving to move the particles and the granules in the direction of the channel;

maintaining the said bed at a temperature within the predetermined range of temperature;

dropping the said material in the said divided state into the vertical columnar fluidized zone;

subjecting granules in the bed and the pulverulent product to circulation currents consequently formed during simultaneous fluidization and vibration;

simultaneously utilizing said circulation currents for feeding, within the container itself, vibrated screening and discharging means with the granules and the particles;

and extracting and discharging the granules to the outside.

2. A method according to claim 1, wherein the granules are produced from a liquid phase of the group consisting of suspended powder in a liquid medium, dissolved powder in a liquid medium, and a molten product, which are capable of forming granules by agglutination or solidification due to a thermal treatment in a given range of temperatures, further including forming during said forming step in the container a bed of particles of an inert product; dropping during said dropping step said material in the liquid phase; and causing the drops of the liquid phase to fall in the fluidized zone of the bed of the pulverulent product.

3. A method according to claim 1, wherein the granules are produced from a pulverulent product able of agglutination by damping with a liquid, further including forming during said forming step in the container a bed of the said pulverulent product; dropping the liquid during said dropping step; and causing the drops of the liquid to fall in the fluidized zone of the bed of the said pulverulent product.

4. A method according to claim 1, wherein performed granules are coated with a pulverulent product by agglutination in a given range of temperature, further including forming during said forming step in the container a bed of the said pulverulent product; and causing the preformed granules to fall in the fluidized zone of the bed of said pulverulent product; and extracting and discharging the thus coated granules to the outside.

5. An apparatus for processing a material in the form of granules or drops, comprising a fluidization container having closed sidewalls and at least one endwall and a bottom and containing a bed of pulverulent solid product used as a processing phase for applying a process which is one of the group consisting of heat and mass transfer, solidification of molten products, crystallization of solutions, liquid-phase evaporation of a liquid suspension of a pulverulent material, agglutination, briquetting, coating, the bottom of said container comprising a grid and means for feeding a fluidization agent upward through the grid, the surface of said bottom being constituted partly of the grid and partly of at least one continuous masking element, said masking element extending substantially the length of said sidewalls and parallel thereto so that only a vertical columnar zone above the grid is fluidized by the fluidization agent while above the remaining portion of the grid is a non-fluidized vertical zone which forms a channel not subjected to the action of the fluidization agent, said apparatus further comprising vibrating means for vibrating said container by means of vibrations applied to each said channel in a direction which is inclined and in a vertical plane substantially in the direction of said channel, separating and discharging means consisting of at least an inclined vibrating discharging screen located at least partly in one of the said channel zones to discharge at an exterior overflow point, and means for introducing the divided material into the vertical portion subjected to the action of the fluidization agent.

6. Apparatus according to claim 5 in which said vibrating screen is vibrated by making it integral with said container subjected to vibrations.

7. Apparatus according to claim 6 in which, at least in its portion inside said container, said vibrating screen is ascending relative to the direction of the vibrations.

8. Apparatus according to claim 5 in which said vibrating screen is vibrated by a means independently of the one used to vibrate said container.

9. Apparatus according to claim 8 in which, at least in its portion inside said container, said vibrating screen is ascending relative to the direction of the vibrations.

10. An apparatus according to claim 5, in which said means for feeding a fluidization agent includes distributing means for feeding only a portion of said bed in said container having an opening with a narrower section than that of said container.

11. An apparatus according to claim 10, in which the direction of the vibrations and the middle plane of said screen form an acute angle, in such a manner that the vibrations of the screen assist the flow of the product in grain form to the outside.

12. An apparatus according to claim 5, in which said screen and the vibrating means are disposed oppositely to one another on said container.

13. An apparatus according to claim 5, in which said means for vibrating said container direct the vibrations rectilinearly, in a direction substantially parallel to said side walls at an angle of from 0° to 80° to the horizontal, the means of vibrating the bed are composed of rigid elements connected to said container, and said vibrating screen is disposed in the upper portion of the bed, in a non-fluidized part, and said same screen is so arranged as to discharge out of said container through vibrations, the granules retained on said screen.

14. An apparatus according to claim 13, in which said screen which separates granules from the pulverulent solid is fastened to the container subjected to the vibrations, the said screen being inclined in relation to the horizontal and its lower portion penetrating into said container while the upper portion constitutes an overflow discharging out of said container.

15. An apparatus according to claim 5, which is provided with a vertical internal partition bounding a fluidized zone.

16. An apparatus according to claim 5 which is provided with a vertical internal partition bounding a fluidized zone and terminating at a certain distance from zones of transfer of products between fluidized and non-fluidized zones.

17. An apparatus according to claim 5 in which heat exchange means are provided in the bed.

18. An apparatus according to claim 5 which comprises flow regulating flaps in the non-fluidized zone above said masking element.

19. An apparatus for processing a material in the form of granules or drops, comprising a circular fluidization container having closed sidewalls and a bottom and containing a bed of pulverulent solid product used as a processing phase for applying a process which is one of the group consisting of heat and mass transfer, solidification of molten products, crystallization of solutions, liquidphase evaporation of a liquid suspension of a pulverulent material, agglutination, briquetting, coating, the bottom of said circular container comprising a grid and means for feeding a fluidization agent upward through the grid including a distributing means which feeds only a central portion of said container, the surface of said bottom being constituted partly of the grid and partly of at least one continuous masking element so that only a vertical columnar zone above the grid is fluidized by the fluidization agent while above the remaining portion of the grid is a non-fluidized vertical zone which forms a channel not subjected to the action of the fluidization agent, said apparatus further comprising vibrating means for vibrating said container by means of horizontal circular vibrations applied to each channel in a direction which is inclined and in a vertical plane substantially in the direction of said channel, separating and discharging means consisting of at least an inclined vibrating discharging screen located at least partly in one of the said channel zones to discharge at an exterior overflow point, and means for introducing the divided material into the vertical portion subjected to the action of the fluidization agent.

20. An apparatus according to claim 19, in which the means of discharging through vibrations the material retained by said screen consists of a projecting helicoidal ramp disposed on the inner face of said container and provided with screening holes at least over a certain length, and that the means of vibrating the container and the fluidized bed produce circumferential jolts on said container and transport in the upper direction the products retained on the helicoidal ramp.

21. An apparatus according to claim 19, in which the helicoidal ramps are provided with an edging.

22. An apparatus according to claim 19, in which a helicoidal deflector is disposed beneath each helicoidal ramp.

23. An apparatus for processing a material in the form of granules or drops, comprising a circular fluidization container having closed sidewalls and a bottom and containing a bed of pulverulent solid product used as a processing phase for applying a process which is one of the group consisting of heat and mass transfer, solidification of molten products, crystallization of solutions, liquidphase evaporation of a liquid suspension of a pulverulent material, agglutination, briquetting, coating, the bottom of said circular container comprising a grid and means for feeding a fluidization agent upward through the grid including a distributing means which feeds only an annular portion of said container, the surface of said bottom being constituted partly of the grid and partly of at least one continuous central masking element, the periphery of which acts as a channel, so that only a vertical columnar zone above the grid is fluidized by the fluidization agent while above the remaining portion of the grid is a non-fluidized vertical zone which forms a channel not subjected to the action of the fluidization agent, said apparatus further comprising vibrating means for vibrating said container by means of vibrations applied to each said channel in a direction which is inclined and in a vertical plane substantially in the direction of said channel, separating and discharging means consisting of at least an inclined vibrating discharging screen located at least partly in one of the said channel zones to discharge at an exterior overflow point, and means for introducing the divided material into the vertical portion subjected to the action of the fluidization agent.

* * * * *